(No Model.) 6 Sheets—Sheet 2.
E. T. BATES.
CASH INDICATOR, REGISTER, RECORDER, AND CALCULATOR.
No. 431,640. Patented July 8, 1890.

WITNESSES
INVENTOR (No Model.)

E. T. BATES.
CASH INDICATOR, REGISTER, RECORDER, AND CALCULATOR.

No. 431,640. Patented July 8, 1890.

Fig. 3.

WITNESSES

INVENTOR
Edward T. Bates.
by Johnston Rienohl & Dye
Attorneys (No Model.) 6 Sheets—Sheet 4.
E. T. BATES.
CASH INDICATOR, REGISTER, RECORDER, AND CALCULATOR.

No. 431,640. Patented July 8, 1890.

WITNESSES
INVENTOR
Edward T. Bates
by
Johnston Reinohl and Dyre
Attorneys

(No Model.) 6 Sheets—Sheet 5.

E. T. BATES.
CASH INDICATOR, REGISTER, RECORDER, AND CALCULATOR.

No. 431,640. Patented July 8, 1890.

WITNESSES
Walter H. Pumphrey
L. B. Whitaker

INVENTOR
Edward T. Bates
by
Johnston Reinohl & Dye
Attorneys (No Model.) 6 Sheets—Sheet 6.
E. T. BATES.
CASH INDICATOR, REGISTER, RECORDER, AND CALCULATOR.
No. 431,640. Patented July 8, 1890.

UNITED STATES PATENT OFFICE.

EDWARD T. BATES, OF WASHINGTON, DISTRICT OF COLUMBIA.

CASH INDICATOR, REGISTER, RECORDER, AND CALCULATOR.

SPECIFICATION forming part of Letters Patent No. 431,640, dated July 8, 1890.

Application filed June 14, 1889. Serial No. 314,274. (No model.)

*To all whom it may concern:*

Be it known that I, EDWARD T. BATES, a citizen of the United States, residing at Washington, in the District of Columbia, have invented certain new and useful Improvements in a Combined Calculator, Indicator, and Recorder; and I do hereby declare the following to be a full, clear, and exact description of the invention, such as will enable others skilled in the art to which it appertains to make and use the same.

My invention relates to devices for calculating, indicating, and recording, and has for its object certain improvements which will be hereinafter described, and particularly pointed out in the claims.

In the accompanying drawings, which form part of this specification, Figure 1 represents a side elevation of my invention.

Figures 7, 8, 9, 10:
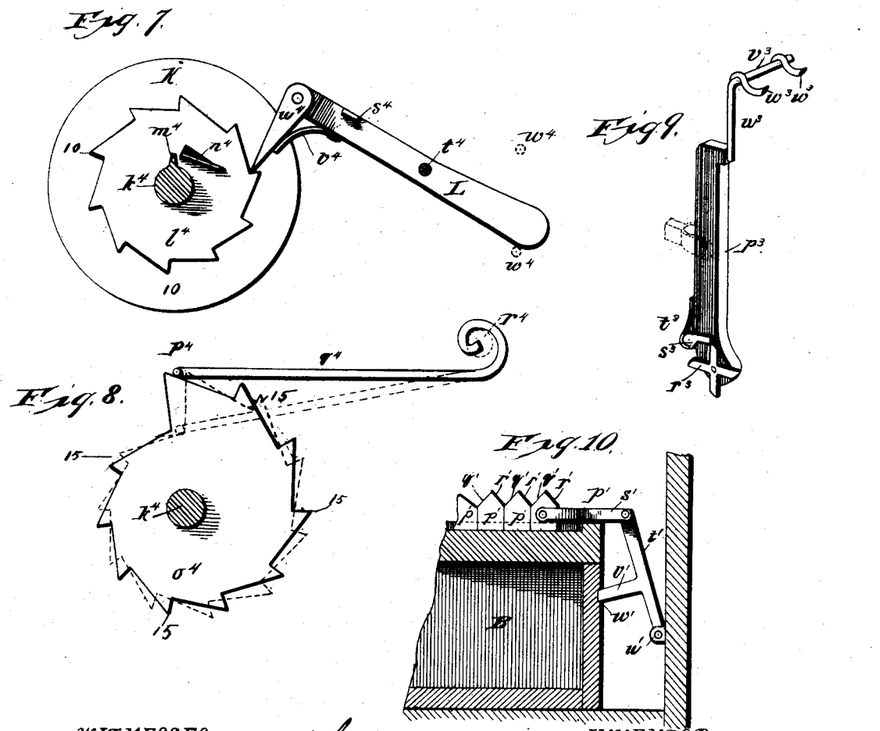
Fig. 7, a side view of one of said wheels.
Fig. 8, a similar view of the reverse side of the wheel.
Fig. 9, a detail perspective of the lever for releasing the indicating-wheels.
Fig. 10, a sectional detail showing part of the drawer and the key-rack and tumblers for releasing the drawer.
Figures 11, 12, 13:
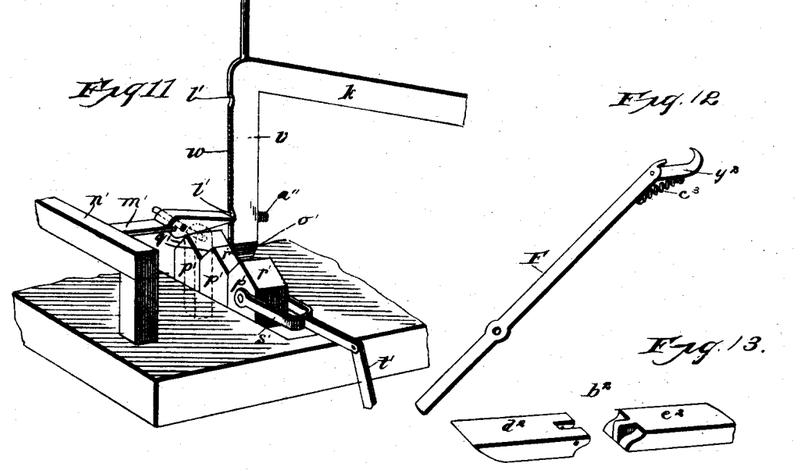
Fig. 11, a perspective of the same mechanism.
Fig. 12, a detail perspective of the lever for resetting the carriage for operating the registering-bars.
Fig. 13, a similar view of the jointed end of the bell-lever.
Figure 14:
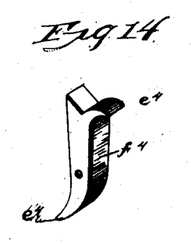
Fig. 14, a perspective of lower pawl on the registering-bar detached.
Figures 15, 16:
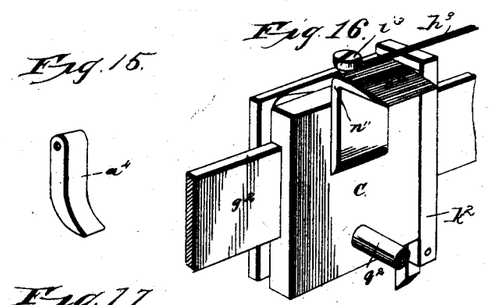
Fig. 15, a similar view of the upper pawl.
Fig. 16, an enlarged detail perspective of the carriage for operating the registering-bars.

Reference being had to the drawings and the letters and figures thereon, A indicates a case or cabinet, in which all the working parts, except the ends of the operating-levers and their respective keys, are inclosed. The keys are indicated by numerals 0 1 2 3 4 5 6 7 8 9, and are respectively attached to levers $a, b, c, d, e, f, g, h, i,$ and $k,$ which are fulcrumed at $l, m, n, o, p, q, r, s, t,$ and $u$ upon posts $a', b', c', d', e', f', g', h', i',$ and $k',$ which are arranged at different points or distances from the ends of the levers, according to the power indicated by the strokes of the lever, determined by the distance the lever raises the registering and indicating bars, which will be hereinafter described. Thus the lever of the least power (numbered 0) has its fulcrum nearest the inner end thereof, as it has the least height to rise to transmit its operative force upon the bars, and the lever numbered 9 has its fulcrum nearest the outer end of the lever, for the reason that it has the greatest distance to rise to move the bars to a height to indicate the power of the lever, and each intermediate lever is fulcrumed at a point to enable it to rise sufficiently to move the bars the required distance to indicate the power of the lever. Each key-lever is bent vertically downward at its outer end $v$, and is provided with teeth $w$ on its outer edge, with which pawls $x$, supported in posts $y$, engage, and with recesses $l'$ for allowing the pawl to turn at each end of the stroke of the lever. The pawls $x$ are held in operative engagement with the teeth $w$ by means of leaf-springs $m'$, which are attached to the outer end of the pawls and to a transverse bar $n'$. By this construction the key-levers must travel throughout their entire stroke before they can be disengaged from the pawls, and prevents the possibility of a lever moving without indicating the power which it represents or its full value, and also prevents the lever being used again before it has been restored to its normal position. The angular or vertical extension $v$ of each lever is inclined on its sides at its lower end $o'$ to cause it to penetrate between and separate the tumblers $p'$, which are provided with corresponding inclined upper surfaces $q'\,r'$, as shown in Figs. 10 and 11, and the last tumbler is connected by a bifurcated link $s'$ to a lever $t'$, fulcrumed to the case or cabinet at $u'$, and provided with an arm $v'$, which engages with the notch or recess $w'$ in one side of the drawer B or other resetting device for the carriage C. On the inner surface of the extensions $v$ are formed studs or projections $a^2$, which engage with the outer end of a lever $b^2$ for striking a bell or other signal $c^2$. The lever $b$ is made in two parts $d^2$ $e^2$ and hinged together, as shown in Fig. 13, so that the downstroke of the lever only strikes the signal, and the stud $a^2$ raises the outer part $d^2$ as the extension $v$ rises.

The signals may be made to produce different sounds and be graduated so that a person may be able at a distance to understand the power of the lever struck by the sound of the signal.

D indicates a vertically-movable frame pivotally supported in posts $e''$, and is of a width to receive the impact of all of the levers $a$, $b$, $c$, $d$, $e$, $f$, $g$, $h$, $i$, and $k$ upon a transverse bar $f^2$ to raise the carriage C and the registering-bar E.

Figures 1, 18:
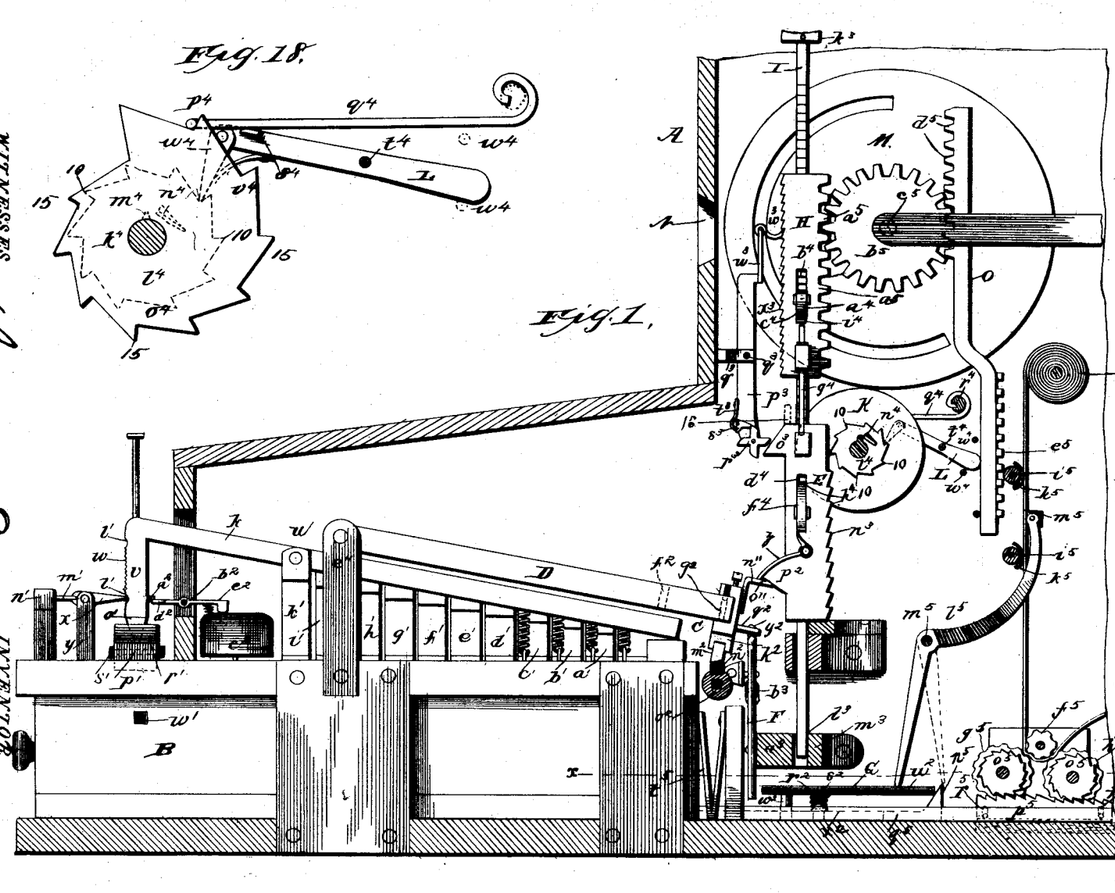
Figure 2:
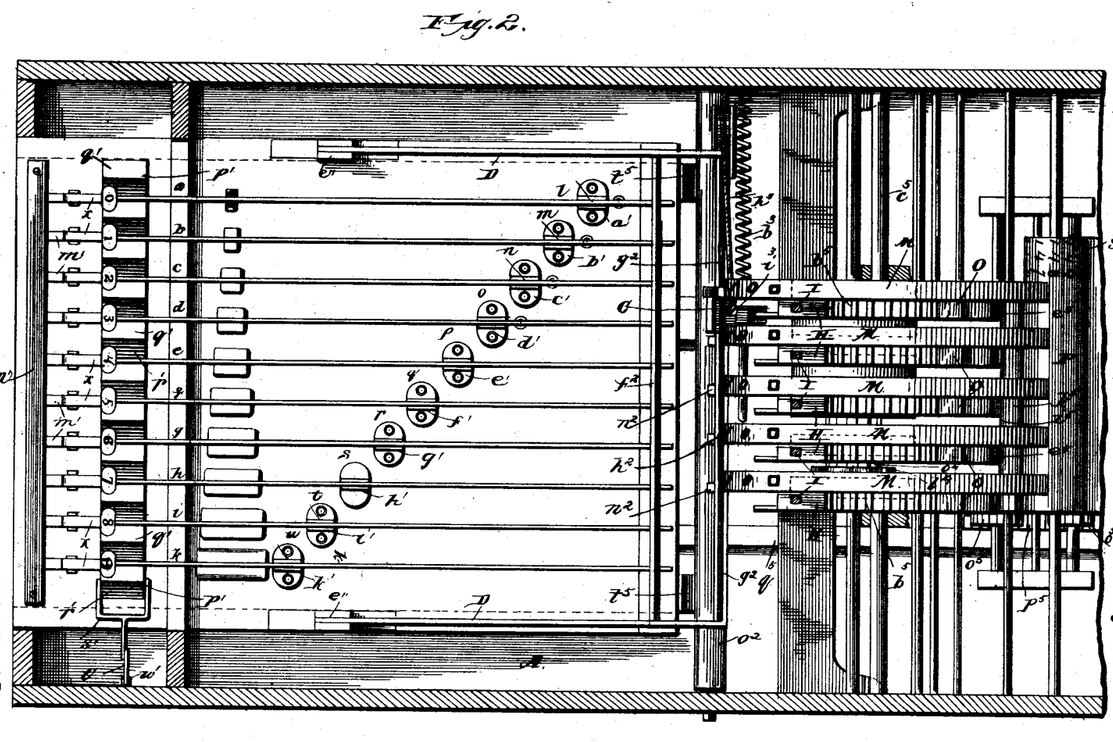
Fig. 2, a plan view.

On the inner end of the frame D is another transverse bar $g^2$, which is provided with a series of notches $h^2$, which are engaged by a bar $i^2$, pivotally attached to the carriage C above the bar $g^2$, and at its lower end to a yoke $k^2$, which is slotted at $l^2$ to slide upon the bar and to rise and fall thereon as the carriage is released from one notch and moved to another. To the lower end of the yoke $k^2$ is attached a swinging weight $m^2$, which, in conjunction with studs $n^2$ on a shaft $o^2$ constitute a tripping mechanism for the carriage when the weight and one of the studs are in alignment, as shown in Fig. 1. The shaft $o^2$ is provided with as many studs as there are notches $h^3$ on the bar $g^2$, and when it is desired to multiply any given number the shaft is turned by any suitable means, so as to throw the studs and the weight $m^2$ out of alignment, when the carriage may be made to strike the register-bar as many times as required without moving the carriage across the bar $g^2$. By pivoting the weight $m^2$ to the yoke $k^2$ the weight swings laterally as it comes in contact with either side of the stud.

To one side of the carriage C is secured an arm $n''$, having an inclined surface $o''$, which engages with an arm or projection $p^2$ on the register-bar E, and from the same side of the carriage projects a stud $q^2$, which engages with a laterally-vibrating lever F, which in turn is engaged at its lower end by a shoe G, which is supported by a post $r^2$, to which is attached a spring $s^2$ for returning the shoe to its normal position. The shoe has angular sides $t^2$ $u^2$ and a transverse slot $v^2$, through which a post $w^2$ projects to limit the lateral movement of the shoe. The shoe is connected to the drawer B by a plate $x^2$, and is operated by the drawer each time it is opened. As the drawer is withdrawn, the side $u^2$ of the shoe slides upon the lever F until the point of the shoe is reached, when the spring $s^2$ draws the point of the shoe to the opposite side of the lever, and when the drawer is pushed back to its place in the cabinet the side $t^2$ of the shoe engages the lever and resets the carriage C by the swinging hook $y^2$ on the upper end of said lever engaging with the stud $q^2$ and pulling the carriage back over the bar $g^2$ and the notches $h^2$.

The lever F is fulcrumed on a block at $a^3$, and to one side thereof is attached a spring $b^3$, which is secured to the cabinet for returning the lever to its normal position, and the hook $y^2$ is drawn back out of the way of the stud $q^2$ as the carriage travels across the frame by a spring $c^3$.

Figure 17:
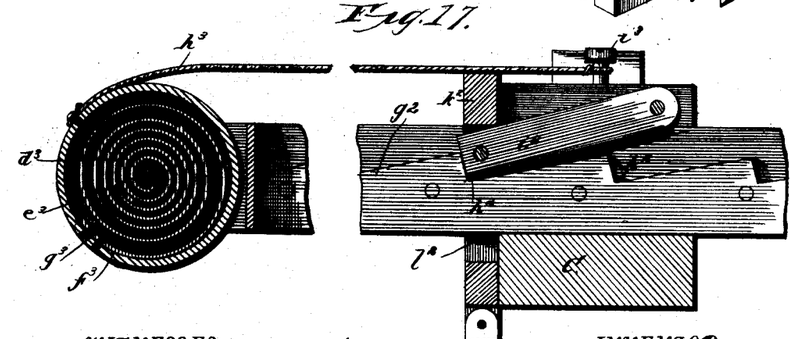
Fig. 17, an enlarged side view of the transverse bar which supports the carriage and the spring for moving it across the bar, and Fig. 18 an enlarged detail showing the carrying mechanism for the register-wheels in operative position.

The carriage C is drawn across the bar $g^2$ by means of a coiled spring $d^3$, one end of which is secured to a post $e^3$, to which is also revolubly secured a drum $f^3$, to the inner surface of which the opposite end of the spring $d^3$ is secured at $g^3$. The spring is wound around the post $e^3$, as shown in Fig. 17, and to the drum $f^3$ is attached one end of a cord $h^3$, and the opposite end is attached to the post $i^3$ on the carriage C. As the carriage is drawn across the bar $g^2$ by the spring $d^3$, the spring unwinds itself from the post $e^3$, and is wound upon the post as the carriage is drawn in the opposite direction by the lever F, moved by the shoe G.

The registering-bars E and the indicating-bars H slide vertically upon guide-bars I, which are secured at their upper ends in pieces $k^3$, which project from the top of the cabinet, and at their lower ends they enter openings $l^3$ in blocks $m^3$, to which the lever F is fulcrumed. The bars I have a little play in the openings $l^3$ to afford movement of the registering-bar E out from the registering-wheel K as the bar descends after having been raised by any one of the key-levers and the swinging frame D. The inner edge of the first or units bar E is provided with a series of teeth $n^3$, which engage with the teeth 10 on one side of the registering-wheel K, and on the opposite or front edge of the bar is the projection $p^2$, which is struck by the arm $n''$ of the carriage C, and the first or units bar is provided with the projection $o^3$, which operates the vibrating lever $p^3$, fulcrumed in a support $q^3$, and having a revolving star-wheel $r^3$ secured to its lower end, which is held in operative contact with the projection $o^3$ when the bar E ascends by a pawl $s^3$ and its support $t^3$, which limits the movement of the pawl. The wheel revolves freely in the opposite direction when the bar E descends.

Figures 4, 5:
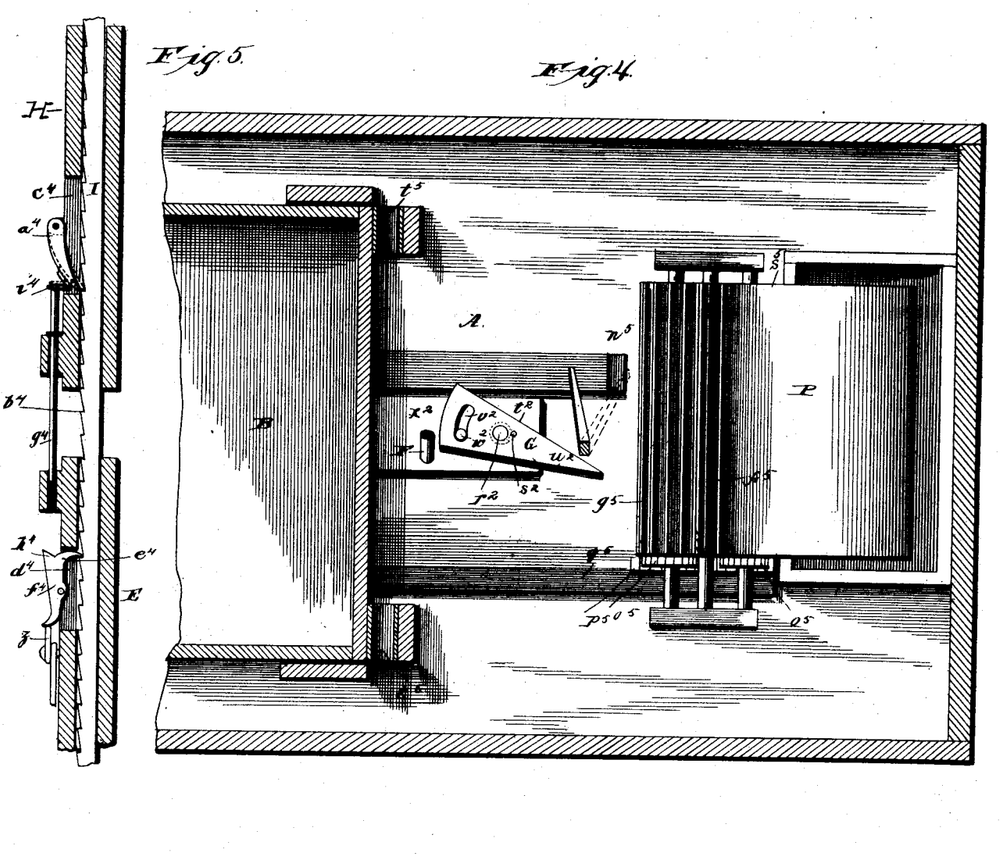
Fig. 4, a plan on the line $x\,x$, Fig. 1.
Fig. 5, a vertical section on line $y\,y$ in the same figure.
Figure 6:
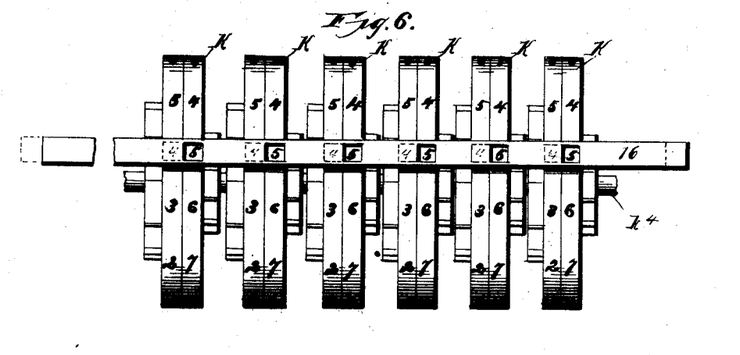
Fig. 6, a front elevation of the registering-wheels.

The upper end of the lever $p^3$ in its vibration strikes the arm $u^3$ of a right-angled lever, which has secured to its other arm $v^3$ a series of curved arms $w^3$, (see Fig. 9,) corresponding in number with the indicator-bars H—one for each—and which as said arms $w^3$ are vibrated by the lever $p^3$ engage with the teeth $x^3$ on the front edge of the indicator-bar H and allow the pawl $a^4$ to swing out of engagement with the teeth $b^4$ on the side of the guide-bar I. The pawl $a^4$ supports the indicator-bar H in the several positions into which it is moved by the impact of the upper end of the registering-bar E when it is raised by the frame D and the carriage C. The pawl $a^4$ projects through a slot $c^4$ in the side of the bar H, and through a slot $d^4$ in the side of the bar E projects one arm $e^4$ of pawl $f^4$ and engages with the teeth $b^4$ of the guide-bar I and supports the bar E in its several positions until the pawl $f^4$ is released by the rod $g^4$ pressing against the arm $h^4$ of the pawl $f^4$ and drawing the arm $e^4$ out of engagement with the teeth $b^4$ of the bar I. The pawl $f^4$ remains in this position by its own gravity until it is reset by the spring $z$, which is struck by the arm $n''$ on the carriage C. This movement of the rod $g^4$ causes its upper end to press upon spring $i^4$, secured to the pawl $a^4$, and cushions the stroke of the rod $g^4$ as it forces the pawl into engagement with the teeth in the bar I to support the bar H, as shown in Figs. 1 and 5. By this construction the bar E is suspended upon the guide-bar I until the bar H has been moved and its pawl $a^4$ has become engaged with the guide-bar, when the pawl $f^4$ will immediately be released by the rod $g^4$ tripping it. This action is possible only when the change in the indicator-wheel is from a higher to a lower number, or when the indicator-bar H is required to descend upon the register-bar E in order to expose the required number on the indicator-wheel M.

Each wheel K is provided with two sets of numerals from 0 to 9, running in opposite directions to each other on the periphery of the wheel, dividing the wheel into ten equal parts corresponding with the number of teeth on the disks $l^4$ and $o^4$, commencing with 0 on the side of the vertical transverse center of the wheel next to the disk $l^4$ at a point which will bring it into exposure through the openings in the sliding bar 16 when the arm $q^4$ passes over the highest tooth on the disk $o^4$, which increase in the direction of the inclined surfaces 17 of the teeth on both disks, and are capable of being used for adding or multiplying. The numerals on the opposite side of the vertical transverse center of the wheel have the numeral 9 placed opposite the 0 first described and continue around the periphery of the wheel at equal distances as the former set, and are capable of being used for subtracting or dividing.

It will be observed that the sum of any two of the numerals opposite each other on the wheel K is nine, and the reason for placing the two sets of numerals in such relative position to each other is, that the pawl L is so arranged that it will act and turn the wheel of the next higher denomination one point when the 0 of the addition or right-hand set of numerals is exposed to view, and since in subtractions the highest figure of the lower denomination must be shown the moment that enough has been subtracted from the amount shown to reduce the lower figure, the amount exposed on the wheel representing the higher denominations, it follows that the pawl L must act when the figure 9 of the lower denomination is exposed, and thus reduce the amount shown on the next higher denomination by one. Consequently the time of action of the pawl L must be when 0 is shown for additions or 9 for subtractions. The indicator-wheel in either transaction or operation, whether it be addition or subtraction, will indicate the separate amounts as they are added to or subtracted from the amount shown on the registering-wheel. This will be more clearly understood when it is borne in mind that only one side of the registering-wheels is in use at any time—i. e., the operator either adds or subtracts, but does not perform both operations at the same time—and that the indicator-wheel must show the value of the key which operates the registering-wheel and the indicator-wheel.

The wheels K are prevented from revolving in the opposite direction by the arms $p^4$ of the spring $q^4$ engaging with the angle of the teeth 15 of the disk $o^4$, or the pawl $u^4$ engaging in the same manner with the teeth 10 of the disk $l^4$.

The several registering-wheels K are supported upon a shaft $k^4$, and on the outside of the disks $l^4$ shoulders $m^4$ project from the shaft and engage with pawls $n^4$, secured to the disks $l^4$, to allow the shaft $k^4$ to revolve in one direction to gather all of the registering-wheels from any position in which they may be and set them at normal, and to prevent the shaft from turning in the opposite direction. In turning the shaft $k^4$ in one direction the projections or shoulders $m^4$ pass under and raise the pawls $n^4$, while in turning it in the opposite direction the projections strike against the end of the pawls and cause the registering-wheels to revolve with the shaft. On the opposite sides of the registering-wheels K are secured disks $o^4$, having ten teeth 15, corresponding in number with the teeth 10 in the periphery of the disks $l^4$, on the other side of the wheels. The disks $o^4$ are eccentric to the shaft $k^4$, as shown in Fig 8, and upon the teeth 15 thereof is supported an arm $p^4$ of spring $q^4$, secured to a transverse bar $r^4$, secured to the side of the cabinet.

When the bar E is in its normal position, as shown in Fig. 1, the teeth $n^3$ are out of engagement with the teeth 10 on the registering-wheel to allow the bar to be raised the length of one tooth or the sweep of the key-lever $a$ without moving the registering-wheel. As the bars E continue to rise, the teeth $n^3$ engage with the teeth 10 and revolve the registering-wheel in proportion to the height the bars have been raised by the sweep of the key-lever used to operate the swinging frame D and the carriage C, and the power of the lever operated upon is indicated by numerals on the periphery of the registering-wheels. The revolution of the registering-wheels by engaging with the bars E stores power in the spring $q^4$ by its arm $p^4$ resting upon the teeth 15 of the eccentric disk $o^4$, and being raised from its lowest position (shown in dotted lines in Fig. 8) to its highest position. (Shown in full lines in the same figure.) When the highest tooth on the disk $o^4$ passes out from beneath the arm $p^4$ of the spring $q^4$, the spring descends and bears upon a projection $s^4$ on the side of each of the pawl-carriers L, with which each of the registering-wheels above the units-wheel is provided, and moves the registering-wheel of the next denomination above the one by which the spring $q^4$ is operated.

The pawl-carriers L are supported upon a transverse shaft $t^4$, and are provided with pawls $u^4$, pivoted thereto, and are held in operative contact with the teeth 10 on the disk $l^4$ by a spring $v^4$, secured to the under side of the pawl-carrier. The pawl-carrier is limited in its motion by the rods $w^4$ $w^4$, between which its weighted end vibrates, and by which weighted end the pawls $u^4$ are raised out of engagement with the teeth 10 when the spring $q^4$ is being raised by the teeth 15 in the disk $o^4$.

Each indicating-bar H is provided with eleven gear-teeth $a^5$, which engage with gear-wheels $b^5$, supported upon a shaft $c^5$, to which the indicating-wheels M are also secured, and are revolved by said indicating-bars H and the wheels $b^5$ as the bars H are raised by the registering-bars E, operated by the key-levers, the swinging frame, and the carriage, and indicate by numerals on their peripheries the value or power of the key-lever used to operate the registering-bar.

The periphery of each indicating-wheel M is spaced and numbered, commencing with a blank or normal space, and numerals 0 to 9, which are exposed to view separately through an aperture N in the cabinet. It will be observed that the bars H are always in engagement with the wheels $b^5$, and that when at normal or their lowest position they rest upon the bars E, and as heretofore stated the bars E are allowed to rise the distance of the sweep of the lever $a$ or the 0 key before coming into engagement with the teeth 10 on the registering-wheels, thus removing the blank or normal space from the aperture N and presenting the numeral 0 at the moment the teeth of the bars E engage with the teeth 10.

Figure 3:
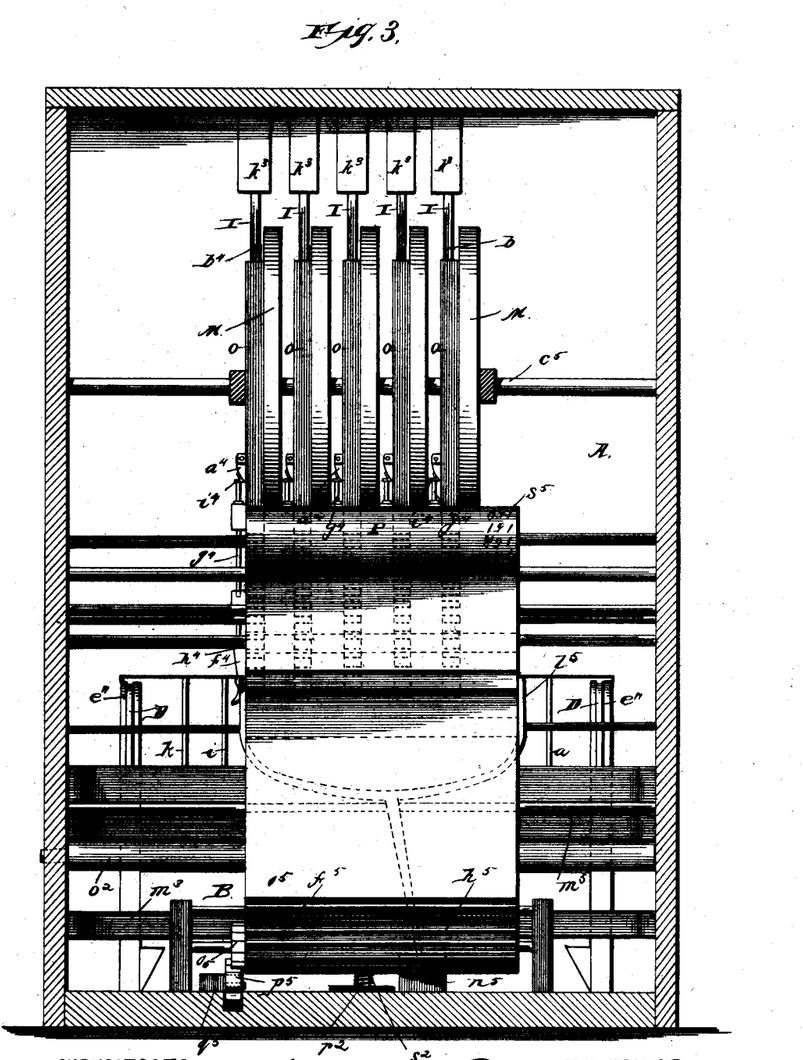
Fig. 3, a rear elevation.

For replacing the indicating-wheels after each use thereof, a spring (not shown) may be applied around the shaft and within the wheels, provided the gravity of the bars H is not sufficient for the purpose. For recording the separate amounts indicated by the wheels M, a bar O, having teeth $d^5$ engaging with the teeth of wheel $b^5$, is connected to each of said wheels M, and on the lowest end of said bar, and on the side of the bar opposite to the teeth $d^5$, are type or raised numerals $e^5$ from 0 to 9, corresponding with the numerals on the periphery of the wheel M, and beginning at the end of the bar and increasing upward, as shown in dotted lines in Fig. 3. The bar O is reciprocated by the wheel $b^5$, as the wheel is revolved by the bar H, and falls as the bar H rises and in proportion to its movement, and rises as the bar H falls in the same manner.

P indicates a roll of paper suspended in the cabinet, and conducted down in line with the lower ends of the bars O by means of feeding-wheels $f^5$, $g^5$, and $h^5$. The type or raised letters are supplied with ink by rolls $i^5$ $i^5$, provided with guards $k^5$ $k^5$ to protect the paper, and the paper is pressed against the type by means of a lever $l^5$, having a transverse bar $m^5$ of rubber or other flexible material between its bifurcated arms. The lever $l^5$ is struck at its lower end by a projection $n^5$, attached to the drawer B, as shown in Fig. 1, and prints upon the paper the amount indicated by the wheels M when the drawer is pushed into the cabinet to its seat and locked position.

The feed-rolls $f^5$, $g^5$, and $h^5$ may be plain cylinders with rubber surfaces, or they may be corrugated, as shown, and made of any suitable material, and the rolls $g^5$ $h^5$ are provided at one end with ratchet-wheels $o^5$, which engage with a vertically-movable ratchet-bar $p^5$, secured to an extension $q^5$ of the drawer B, for moving the rolls and feeding the paper when the drawer is open. The bar $p^5$ is provided with vertical slots $r^5$ $r^5$, to allow the bar to be depressed to pass the ratchet-wheels without revolving the feed-rolls when the drawer is pushed in, and the teeth on the rear half of the bar are lower than on the front half to prevent the teeth revolving the front roll as they pass under it. The rear roll $h^5$ is hung a little lower than the front roll $g^5$, to cause its ratchet-wheel $o^5$ to engage with the low teeth on the bar $p^5$.

The roll of paper P is made wider than the space occupied by the bars O to provide a margin $s^5$, on which serial numbers have previously been printed, the office or purpose of which is to indicate at any time how often the drawer has been opened, and also provides a means for identifying the amount recorded at any particular transaction and comparing it with other memoranda of the same transaction.

The drawer B is cushioned upon springs $t^5$ to prevent jarring of any of the parts which it operates, and to push the drawer out of the cabinet when released.

It will be observed that only ten key-levers are used to produce any and all of the manipulations of the machine, which having been constructed substantially as described, the operation is as follows:

For illustration, we will suppose the machine is being used to register, indicate, and record the sum of the several amounts 24 to 86. The registering-wheels are all set at 0. The indicating-wheels are all at normal, as are also the type operated by them, and the carriage C is also at normal or under the first of the bars E and H or unit-bars. The operator will first strike the 4 key, (being the number of units in the first amount.) This will raise the units-bar E up sufficiently to turn the units registering-wheel to 4 at the exposed point, and at the same time raise the unit-bar H sufficiently to expose the numeral 4 on the indicating-wheel M at the aperture.

The drawer B will be released by means of the tumblers $p'$ and the levers $s'$ $t'$, Fig. 10, and will be caused to fly open by the force of the springs against which it is cushioned. When the key 4 is released and the carriage C descends, the carriage C will be tripped one notch by means of the tripping mechanism described, and it will then be directly under the tens-bars E and H. The operator will then strike the 2 key, which will raise the tens-bars 2 in the same manner as 4 is shown by the units-bar. The first amount having been registered, the operator will close the drawer, in doing which the lever $l^5$ will be struck by the projection $n^5$, and the bar $m^5$ will press the paper against the type and record the amount 24, these being the figures that will be opposite the bar $m^5$ on the type-bars O, depending from the units and tens wheels $b^5$. In closing the drawer the angular side $t^2$ of the shoe G comes in contact with and pushes aside the lower end of the lever F, Fig. 4, giving the reverse motion to the upper end of said lever Fig. 12. The hook $y^2$ on said lever in its movement comes in contact with the projection $q^2$ of the carriage C, and, continuing said motion, takes the carriage back to its normal position under the units-bars, thus winding the spring $d^3$ and leaving the said carriage ready for the next operation. It will be observed that the units and tens indicating wheels M are held at the position at which they were set by the pawls $a^4$ on the bars H catching into the teeth $b^4$ on the bars I, while the bars E or registering-bars immediately descend to their normal position, having played off from the teeth 10 by the lateral movement allowed to the lower end of the bars I and the inability of the registering-wheels K to revolve in a backward direction on account of the arm $p^4$ engaging the angle of the teeth 15 on the reverse side of the wheel K, the rod $q^4$, Fig. 5, being in engagement with arm $h^4$ of the pawl $f^4$, thus preventing the other arm $l^4$ from engaging the teeth $b^4$ on the bar I when the surface $o''$ of the arm $n''$ on the carriage C comes in contact with the spring $z$ on the rod E. The next amount 86 will be treated, so far as pressing of the key is concerned, in the same manner. The operator will strike the key 6, being the units of the amount, which will raise the carriage C against the units-bar E and raise it sufficiently to turn the registering-wheel K six degrees, which, added to the four (4) previously exposed, will bring the 0 around to the point of exposure. Now as the teeth 17 pass under the arm $p^4$ of the spring $q^4$ at the highest point of the eccentric wheel $o^4$—i. e., the moment the character 0 is displayed the spring $q^4$ will descend to the lowest point on the periphery of said wheel $o^4$, and in descending strike the arm $s^4$ on the pawl-carrier $l$, (see Fig. 18,) holding the pawl $u^4$ in engagement with the teeth 17 of the tens-wheel $l'$, and will press this pawl down to its limit, or one degree, thus revolving the tens-wheel one degree and exposing on its periphery the figure 3. As the bar E begins to ascend, its projection $O^3$ comes in contact with the star-wheel $r^3$ on the lever $p^3$, which presses the lever $u^3$ of the pivoted bar $v^3$, thus raising the points of the fingers $w^3$, which engage the teeth $x^3$ on the bar H, giving the bar a slight impetus upward, allowing the pawls $a^4$ to drop out of engagement with the teeth $b^4$ on the bar I, and as the projection $o^3$ passes from contact with the wheel $r^3$ the lever $q^3$ vibrates back to its normal position, thus removing the support to the finger of the lever $u^3$ and dropping the bars H, which continue to descend to normal or until met by the ascending bars E, when they are immediately again set by said bars E and sustained in their position by the rod $g^4$, pressing upon the spring $i^4$ of the pawl $a^4$, and engaging it with the teeth $b^4$ of the bar I. When the key 6 is released, the carriage C is tripped to the tens-bar the same as in the first operation. The operator then presses the key 8, which raises the tens-bar eight degrees, and as the point of view was previously at 3 on the tens-registering wheel it will be revolved to 1, and in passing the 0 its spring $q^4$ will operate on the pawl $a^4$ of the hundreds-wheel K and change it from 0 to 1, thus indicating on the hundreds-wheel 1, on the tens-wheel 1, and on the units-wheel 0 the sum of the amounts 24 and 86.

Having thus fully described my invention, what I claim is—

1. The combination of a series of key-levers, registering-wheels, means for operating said wheels, a movable frame having a transverse bar at its front end provided with a series of notches, and a movable carriage on said bar, substantially as described.

2. The combination of a series of key-levers, registering-wheels, means for operating said wheels, a movable frame having a transverse bar provided with a series of notches, a carriage on said bar having a pivoted bar engaging said notches, and a releasing device for the carriage, substantially as described.

3. The combination of a series of key-levers, registering-wheels, means for moving said wheels, a movable frame having a transverse bar provided with a series of notches, a carriage on said bar, having a slotted yoke and a bar pivoted to the carriage and to the yoke for engaging with said notches, a releasing device, and a resetting device, substantially as described.

4. The combination of a series of key-levers, registering-wheels, means for operating said wheels, a movable frame, a movable carriage supported by said frame, means for tripping or releasing the carriage, and a lever for resetting the carriage, substantially as described.

5. A movable carriage having a slotted yoke, a bar pivoted to the body of the carriage and the yoke, an arm extending from one side of the carriage, and a stud on one side, substantially as described.

6. The combination of a series of key-levers, registering-wheels, means for operating said wheels, consisting of a movable frame, a movable connection supported upon said frame between the levers and the wheels, common to all of the keys and operating all of the wheels, a releasing mechanism for said movable connection, a resetting device, and a laterally-vibrating shoe, substantially as described.

7. The combination of a series of key-levers, registering-wheels, and operating devices consisting of a movable connection between the levers and the wheels, and a resetting device consisting of a lever and a shoe having angular sides and supported so as to vibrate laterally on a post secured to a movable part of the cabinet, substantially as described.

8. The resetting mechanism described, consisting of a swinging lever, a laterally-vibrating shoe having angular sides, a transverse slot, a supporting-post, and springs for restoring the lever and the shoe to their normal positions, substantially as described.

9. A series of key-levers, a vertically-movable frame, a movable carriage supported on said frame, and a device for drawing said carriage across the frame, in combination with registering-wheels, means for operating said wheels, and a device for returning the carriage to its normal position, substantially as described.

10. A series of key-levers, a vertically-movable frame, a movable carriage supported on said frame, a spring-actuated drum connected to said carriage, and a tripping mechanism, in combination with registering-wheels, bars constructed to operate said wheels, and a device for resetting the carriage, substantially as described.

11. A series of key-levers fulcrumed at different points in their length, and a swinging frame struck by all of the levers, in combination with a series of registering-wheels and operating mechanism consisting of a movable carriage supported on said frame and common to all of the wheels, substantially as described.

12. A key-lever, in combination with laterally-movable tumblers and a locking device for securing a drawer in closed position, substantially as described.

13. A series of key-levers provided with angular extensions and inclined ends, in combination with a series of tumblers having angular upper surfaces and constructed to be separated by the levers, a drawer, and a lever operated by the tumblers, substantially as described.

14. A key-lever provided with an angular extension having teeth on one edge thereof and a pawl engaging said teeth and having a spring connected to one end of the pawl and to a bar, in combination with separable tumblers, a locking device, and a drawer in the cabinet, substantially as described.

15. A registering-wheel and registering-bar having teeth to engage with teeth on the wheel, and provided with a slot in one side, and a pawl projecting through said slot, in combination with a guide-bar having teeth on one side with which said pawl engages, a movable frame, and a movable carriage for operating said lever, substantially as described.

16. A registering-wheel and a bar having teeth for operating said wheel, a slot in one side, and projections at both ends on the edge opposite its teeth, a pawl projecting through said slot, and means for tripping said pawl, in combination with a guide-bar, an indicator-bar operated by the registering-bar, and an indicating-wheel, substantially as described.

17. A registering-wheel, an indicating-wheel, and a guide-bar having teeth on one of its surfaces, in combination with a register-bar and an indicator-bar supported upon said guide-bar, pawls attached to the movable bars and engaging with the guide-bar, means for operating the register and indicator bars, and a tripping mechanism for releasing the pawls, substantially as described.

18. A register-bar having projections near its ends and an indicator-bar, in combination with a swinging lever engaging with the register-bar at one end and with the indicator-bar at the opposite end, substantially as described.

19. The combination of a register-bar, an indicator-bar, a swinging lever having a revolving wheel at one end, and a lever engaging the indicator-bar and operated by said swinging lever, substantially as described.

20. The combination of a register-bar having a projection near its upper end, an indicator-bar having teeth on its front edge, and a swinging lever having a revolving wheel and a pawl at one end, and a lever having projecting arms engaging the teeth on the indicator-bar and operated by said swinging lever, substantially as described.

21. The combination of a key-lever, a movable frame, a rack-bar, a registering-wheel having a circular toothed disk on one side with which said bar engages, and an eccentric toothed disk on the opposite side, a pawl engaging with the teeth on the circular disk, and a spring engaging with the teeth on the eccentric disk, substantially as described.

22. The combination of key-levers, a movable frame common to all of the levers, a carriage supported on said frame, rack-bars, registering-wheels having an eccentric toothed disk on one side thereof, a spring engaging with said teeth for storing power and preventing the wheel revolving in the opposite direction, a circular toothed disk on the adjacent registering-wheel, and a vibrating pawl-carrier having a pawl engaging with the teeth of the latter disk and forced down to revolve the registering-wheel by the spring, substantially as described.

23. In a registering and indicating device, a key-lever, a swinging frame, and a movable carriage, in combination with a registering-wheel having two columns of numerals on its periphery, arranged around the wheel in opposite directions, an indicator-wheel for exhibiting each separate amount as it is added to or subtracted from the amount shown on the registering-wheel, and a connection between the two wheels operated by said movable carriage, substantially as described.

24. A registering device and an indicator connected therewith and having a toothed wheel attached thereto, in combination with a bar having teeth at one end to engage with said wheel, raised numerals on said bar, an inking device, a roll of paper, and a device for pressing the paper against the raised numerals, constructed to record any given amount shown on the indicator, substantially as described.

25. A combined registering, indicating, and recording device, consisting of registering and indicating mechanism and movable bars having raised numerals thereon, in combination with indicating-wheels, suitable connections between the bars and the wheels, a roll of paper, and means for pressing the paper against the numerals, substantially as described.

26. In a combined register, indicator, and recorder, mechanism for operating each of said devices, a sheet of paper having numerals on its margin to indicate each operation of the instrument and arranged to have each transaction recorded separately thereon, substantially as described.

27. In a combined register, indicator, and recorder, one or more sets of type, a roll of paper, a printing mechanism, a feeding mechanism, and a drawer having means attached thereto for operating both of said mechanisms, substantially as described.

28. In a combined register, indicator, and recorder, one or more sets of type supported upon vertically-movable bars, a roll of paper, and a bar operated by the drawer for pressing the paper against the type when the drawer is returned to the cabinet, substantially as described.

29. In a combined register, indicator, and recorder, one or more sets of type, a roll of paper, a bar for pressing the paper against the type, a feed mechanism for the paper, and a connection with the drawer to feed the paper each time the drawer is withdrawn from the cabinet and to press the paper against the type when it is closed, substantially as described.

30. In a combined register, indicator, and recorder, one or more sets of type, a roll of paper, a printing mechanism, a feed mechanism, and a vertically-movable plate having teeth on its upper edge for engaging with ratchet-wheels on the feed-rolls, substantially as described.

In testimony whereof I affix my signature in presence of two witnesses.

EDWARD T. BATES.

Witnesses:
CHAS. W. DARR,
WM. E. DYRE.